(12) United States Patent
Budhrani et al.

(10) Patent No.: US 11,238,271 B2
(45) Date of Patent: Feb. 1, 2022

(54) DETECTING ARTIFICIAL FACIAL IMAGES USING FACIAL LANDMARKS

(71) Applicant: Hochschule Darmstadt, Darmstadt (DE)

(72) Inventors: Dhanesh Budhrani Budhrani, Palma de Mallorca (ES); Ulrich Scherhag, Darmstadt (DE); Christoph Busch, Darmstadt (DE); Marta Gomez-Barrero, Darmstadt (DE)

(73) Assignee: Hochschule Darmstadt, Darmstadt (DE)

( * ) Notice: Subject to any disclaimer, the term of this patent is extended or adjusted under 35 U.S.C. 154(b) by 5 days.

(21) Appl. No.: 16/624,840

(22) PCT Filed: Jun. 20, 2018

(86) PCT No.: PCT/EP2018/066432
§ 371 (c)(1),
(2) Date: Dec. 19, 2019

(87) PCT Pub. No.: WO2018/234384
PCT Pub. Date: Dec. 27, 2018

(65) Prior Publication Data
US 2020/0218885 A1 Jul. 9, 2020

(30) Foreign Application Priority Data
Jun. 20, 2017 (DE) ...................... 10 2017 113 589.8

(51) Int. Cl.
*G06K 9/00* (2006.01)
*G06N 20/10* (2019.01)
*G06K 9/62* (2006.01)

(52) U.S. Cl.
CPC ..... *G06K 9/00288* (2013.01); *G06K 9/00248* (2013.01); *G06K 9/00261* (2013.01);
(Continued)

(58) Field of Classification Search
CPC .......... G06K 9/00288; G06K 9/00248; G06K 9/00261; G06K 9/00281; G06K 9/00906;
(Continued)

(56) References Cited

U.S. PATENT DOCUMENTS

2009/0244098 A1* 10/2009 Tateishi ................. G06T 13/80
345/646
2014/0016837 A1* 1/2014 Nechyba ............ G06K 9/00221
382/118
(Continued)

OTHER PUBLICATIONS

King, "Dlib-ml: A Machine Learning Toolkit", Journal of Machine Learning Research 10, 2009, pp. 1755-1758.
(Continued)

*Primary Examiner* — Edward F Urban
*Assistant Examiner* — Wassim Mahrouka
(74) *Attorney, Agent, or Firm* — Seed Intellectual Property Law Group LLP

(57) ABSTRACT

A method and a device for classifying facial images includes retrieving a first plurality of facial landmarks of a provided facial image associated with a subject, determining a corresponding second plurality of facial landmarks of a captured facial image of the subject, and extracting at least one feature vector based on differences between at least some of the first plurality of facial landmarks and corresponding facial landmarks of the second plurality of facial landmarks, wherein at least some values of the at least one feature vector represent angular values of facial landmarks, and supplying the at least one feature vector to a classifier to classify the provided facial image as a real facial image of the subject or as an artificial facial image.

18 Claims, 5 Drawing Sheets

(52) U.S. Cl.
CPC ..... *G06K 9/00281* (2013.01); *G06K 9/00906* (2013.01); *G06K 9/6269* (2013.01); *G06N 20/10* (2019.01)

(58) Field of Classification Search
CPC ... G06K 9/6269; G06K 9/00899; G06N 20/10
See application file for complete search history.

(56) References Cited

U.S. PATENT DOCUMENTS

| | | | |
|---|---|---|---|
| 2014/0185926 A1* | 7/2014 | Ricanek, Jr. | G06K 9/00221 |
| | | | 382/159 |
| 2016/0224853 A1* | 8/2016 | Xiong | G06K 9/00228 |
| 2017/0116705 A1* | 4/2017 | Kim | G06K 9/00281 |
| 2018/0276869 A1* | 9/2018 | Matts | G06Q 30/0631 |

OTHER PUBLICATIONS

Raghavendra et al., "Detecting Morphed Face Images", *2016 IEEE 8th International Conference on Biometrics Theory, Applications and Systems (BTAS), IEEE*, Sep. 6, 2016, pp. 1-7, XP033035149.

Scherhag et al., "On the Vulnerability of Face Recognition Systems Towards Morphed Face Attacks", *2017 5th International Workshop on Biometrics and Forensics (IWBF), IEEE*, Apr. 4, 2017, pp. 1-6, XP033100322.

Gomez-Barrero et al., "Is Your Biometric System Robust to Morphing Attacks?", *2017 5th International Workshop on Biometrics and Forensics (IWBF), IEEE*, Apr. 4, 2017, pp. 1-6, XP033100360.

International Search Report for Application No. PCT/EP2018/066432, dated Sep. 5, 2018, 3 pages.

\* cited by examiner

DETECTING ARTIFICIAL FACIAL IMAGES USING FACIAL LANDMARKS

BACKGROUND

Technical Field

The present disclosure relates to classification of facial images and detection of artificial facial images using facial landmarks. In particular, the present disclosure may relate to detection of morphed facial images.

Description of the Related Art

The area of biometrics refers to recognition of individuals based on their biological and behavioral characteristics. Face recognition systems are widely used in various security-related scenarios to recognize individuals. Face recognition systems rely on facial images or respective biometric features representing individuals. In order to recognize an individual, this data is compared with reference facial images or derived features of the individual. For example, in automated border control systems, facial images stored on electronic passports are used to authenticate a bearer of the passport. Since the authentication relies on the provided facial image and the biometric features derived from that image, the authenticity of the provided facial image plays a central role.

BRIEF SUMMARY

Embodiments of the present disclosure enable control of authenticity of facial images, such as facial images stored on electronic documents. In particular, embodiments of the present disclosure enable a determination, whether a provided facial image has been artificially generated or manipulated. Accordingly, embodiments of the present disclosure enable a determination of whether the provided facial image represents an artificially generated facial image or whether it corresponds to a real and authentic facial image of an individual.

Since face recognition heavily relies on authenticity of provided facial images, manipulated facial images may lead to incorrect or erroneous authentication results and constitute a severe threat to security and reliability of facial recognition. In particular, facial images may be manipulated such that they still closely resemble an original individual or subject. Hence, it may be difficult for a human to visually detect a manipulation in the facial image. Artificially generated facial images may be manipulated in such a way that their evaluation may result in (biometric) features that may be similar or correspond to those of one or more different individuals or subjects. Hence, a different individual or subject may be identified, verified or authenticated using the (manipulated) artificially generated facial image resembling the original subject. For example, real facial images of two or more subjects may be combined into a single artificial facial image that may resemble at least some of the two or more subjects in both their visual and biometric feature representations. If the artificial facial image is used for facial recognition, the same artificial facial image may be used to identify, verify or authenticate any of the two or more constituting subjects. Hence, facial recognition may be attacked by injecting manipulated or artificially generated facial images, for example, during an application process for electronic documents or during registration of subjects. In particular, this may lead to an incorrect association of the artificial facial image with the original individual or subject and a storage of the artificial facial image on the electronic document or in a trusted database, potentially resulting in erroneous identification, verification or authentication of other individuals or subjects.

Manipulation of facial images may lead to detectable artifacts. Hence, by analyzing images with regard to typical artifacts, a manipulation of facial images may be detected. R. Raghavendra et al.: "Detecting Morphed Face Images", Proceedings of the $8^{th}$ IEEE International Conference on Biometrics: Theory, Applications, and Systems, 2016, proposed a detection of morphed facial images based on established multi-purpose image descriptors. This represents a structural analysis of color values and patterns in the image based on image descriptors. However, the images that are analyzed cannot be classified with a detection accuracy that is appropriate for operational use. Hence, the approach may fail if the images are printed, for example, as printed photographs that may be handed over to an authority during a passport application process. The printed images may further require scanning of the images before a further analysis may start. Any of these conversion steps may lead to an additional loss of detectable artifacts.

Printing and scanning of digitally morphed facial images may further affect face recognition and morphing detection. Since printing and scanning may add noise and granularity to the facial image, the performance of face recognition and detection of morphed faces may be negatively affected, such that it may be difficult to identify the printed and scanned image as a morphed image. In any case, morphed facial images are a severe threat to face recognition systems.

The present disclosure introduces a detection of artificial facial images by comparing facial landmarks of a provided facial image with facial landmarks of a captured facial image of the subject. The provided facial image may be the image that is to be evaluated. The provided facial image may be provided, for example, via an electronic document or other secured storage during identification, verification or authentication procedure, or the provided facial image may be provided during an application process for the electronic document as a printed image or in digital form. The captured facial image may be a trusted facial image, which may be acquired in a supervised or attended capture scenario. For example, the (trusted) captured facial image may be acquired under supervision on site or may be contributed by a Trusted Third Party (TTP). Hence, the captured facial image may be referred to as a trusted facial image, a trusted captured facial image and/or a bona fide facial image throughout this disclosure. The skilled person will understand that a bona fide presentation can be understood as an interaction of a biometric capture subject and a biometric data capture (sub-)system in a fashion intended by a policy of the biometric system, as specified in ISO/IEC 30107-3, clause 4.2. The bona fide facial image may be directly captured, scanned or acquired since the subject claiming to correspond to the provided facial image is present or readily available for an additional scan during the authentication procedure or the application processing. However, it is to be understood that embodiments of the present disclosure are not limited to these scenarios only and, additionally or as an alternative, the captured facial image may be retrieved from a secured database or from a safe storage for the same or any other scenario, which requires a verification of a provided facial image.

One aspect of the present disclosure defines a method for classifying facial images comprising retrieving a first plurality of facial landmarks of a provided facial image (claimed to be) associated with a subject, determining a corresponding second plurality of facial landmarks of a captured facial image of the subject, extracting at least one feature vector based on differences between at least some of the first plurality of facial landmarks and corresponding facial landmarks of the second plurality of facial landmarks, wherein at least some values of the at least one feature vector represent angular values of facial landmarks, and supplying the at least one feature vector to a classifier to classify the provided facial image as a real facial image of the subject or as an artificial facial image.

The first and second plurality of facial landmarks may also be understood as and/or referred to throughout this disclosure as a first and second representation of facial landmarks, respectively. Preferably, a representation of facial landmarks may include a plurality of facial landmarks.

The provided facial image may be a facial image stored in memory, such as a memory of an electronic chip or any other memory of an electronic device, a portable or mobile device, an electronic document or the like. For example, a printed facial image may be re-digitized and stored in the memory as the provided facial image. Preferably, the electronic device or electronic document may comprise an identification card, an electronic travel document, a payment instrument or any other electronic document suitable for an automated identification, authentication and/or verification of the bearer of the electronic document, such as an electronic passport. The provided facial image may be retrieved from the memory and may be further processed to determine the first plurality of facial landmarks or the first representation of facial landmarks. Additionally or as an alternative, at least some of the first plurality of facial landmarks may be previously generated during an application process for the electronic document and may be stored in the memory or on the electronic document. Accordingly, the first plurality of facial landmarks may be at least partially retrieved from the memory of the electronic document. Additionally or as an alternative, the provided facial image may be a printed photograph that may be handed over during the application process for the electronic document or which may be printed on the electronic document. In such a case, the printed photograph may be scanned and the scanned image may be buffered in electronic form to generate the first plurality of facial landmarks of the provided facial image.

The captured facial image of the subject may be a bona fide facial image, which may be scanned during the application process or captured during authentication of the subject. Based on the captured facial image, the second plurality of facial landmarks or the second representation of facial landmarks may be determined and stored or buffered for subsequent extraction of the at least one feature vector.

The first plurality of facial landmarks and the corresponding second plurality of facial landmarks may be determined using established approaches for extraction of facial landmarks, such as using the dlib facial landmark predictor, as disclosed in D. E. King: "Dlib-ml: A machine learning toolkit", Journal of Machine Learning Research, 2009. For example, the dlib predictor may return 68 facial landmarks. However, it is to be understood that any other approach for extraction of facial landmarks, any other number of facial landmarks, or different facial landmarks of any size may be used in embodiments of the present disclosure. The first plurality of facial landmarks and the second plurality of facial landmarks may include a set of corresponding facial landmarks, such as landmarks related to the eyes, the eyebrows, the nose, mouth or jaw line, and others, in any combination.

At least some of the first plurality of facial landmarks may be compared to corresponding facial landmarks of the second plurality of facial landmarks in order to determine differences between the corresponding facial landmarks. The differences may be used as a basis for extraction of individual features or respective values of the at least one feature vector.

At least some features or values of the at least one feature vector may represent angular values of facial landmarks. The angular values may reflect an orientation of a difference vector between corresponding facial landmarks of the first plurality of facial landmarks and the second plurality of facial landmarks. Features based on angular values of differences between corresponding facial landmarks define a highly selective and reliable indicator enabling classification of provided facial images as artificial images or real images of the subject. This is based on the assumption that an intra-subject variance of facial landmarks extracted from real facial images is smaller than a variance between landmarks of an artificial facial image and a real facial image.

The present disclosure enables an efficient determination whether a provided facial image is an artificial facial image or not. This determination is based on a comparison of facial features derived from the provided facial image with a captured bona fide image and does not require any structural analysis of the provided facial image, which can be easily lost during initial processing of the provided facial image. The captured facial image may be readily obtained since the subject to be authenticated or applying for the electronic document is typically present. Hence, the automated or semi-supervised approach according to the present disclosure may be fully integrated into established application or authentication procedures or system.

In at least one embodiment, the artificial facial images include morphed facial images generated by morphing two or more real facial images of two or more subjects. A morphed facial image may blend features of a facial image of a first subject i with at least one further facial image of at least one other subject j. Hence, the morphed facial image may represent characteristics and similarities of the two or more subjects i, j in one artificial facial image. Regarding facial landmarks $l_m(x_m, y_m)$ of the morphed facial image and corresponding facial landmarks in the facial images of subjects i and j, which may be denoted as $l_i(x_i, y_i)$ and $l_j(x_j, y_j)$, $l_m$ may be given as:

$$x_m = (1-\alpha)x_i + \alpha x_j$$

$$y_m = (1-\alpha)y_i + \alpha y_j$$

where $\alpha$ defines a ratio of the contribution of subject j to the morphed facial image.

According to at least one embodiment, the method further comprises scanning a face of the subject to generate the captured facial image. The captured facial image may be a trusted facial image, which can be considered as trusted since it was captured in an attended or supervised mode. Accordingly, capturing of the facial image may also be referred to as an attended capture or supervised capture.

In at least one embodiment, each facial landmark in the first and second plurality of facial landmarks has an associated facial landmark in the same plurality of facial landmarks, and the method may further comprise determining, for each facial landmark, a landmark vector between the facial landmark and the associated facial landmark. The skilled person will understand that an associated facial landmark may also be understood as and referred to as a mated facial landmark, as defined in ISO/IEC 2382-37, clause 37.03.32. Hence, each facial landmark in the first plurality of facial landmarks and the second plurality of facial landmarks may have a mated facial landmark in the same plurality of facial landmarks, and the method may further comprise determining, for each facial landmark, a landmark vector between the facial landmark and the mated facial landmark. Preferably, the associated facial landmark may be a neighbor of the facial landmark according to semantic dependencies between the facial landmarks. The semantic dependencies may be pre-defined for each set of facial landmarks and may correspond to each other set of facial landmarks due to application of the same landmark extraction process. Furthermore, metadata may be used to describe semantics of a particular set of facial landmarks. The neighborhood may be either implicitly defined by the structure of the set or explicitly defined by the metadata. For example, the set of facial landmarks may include a number of facial landmarks localizing the left or right eye of the subject and its contour in a particular order. The order may define a successor or neighbor for each landmark. If a respective facial landmark is missing in a plurality of facial landmarks, for example, due to an occlusion in the facial image, the respective facial landmark may be omitted or excluded from the feature vector. A definition of corresponding landmark vectors in the plurality of facial landmarks may include information on a relative orientation of the facial landmarks in the context of the facial image.

In a preferred embodiment of the present disclosure, the method further comprises determining, for each facial image, at least a first axis of a face depicted in the facial image and determining for each facial landmark in the corresponding plurality of facial landmarks, an angle of a landmark vector of the facial landmark with respect to at least the first axis. Further to absolute or relative positions in the facial images, the plurality of facial landmarks may be used to determine an orientation of the face depicted in the facial image. The orientation may be used to define the first axis of the face, such as a horizontal axis or a vertical axis of the face. In addition or as an alternative, any axis as defined based on orientation of the face may be specified as the first axis. For example, the first axis may be defined by an orientation and position of the left and right eyes, the left and right eyebrows, positions of the left and right nostrils of the nose, a progression of the mouth or of the jaw line, and the like, in any combination. Even though the first axis may be referred to as a horizontal line throughout the present disclosure, it is to be understood that each axis as defined between corresponding left and right facial landmarks or a contour of facial landmarks may result in a plurality of axes that may be substantially parallel and/or that may be inclined with an angle and/or that may be substantially perpendicular. However, preferably, the same first axis as defined by a set of facial landmarks of the provided facial image may be used as the first axis as defined by the corresponding facial landmarks of the captured facial image.

In at least one embodiment, the angular value of the facial landmark is calculated as a difference between the angle of the landmark vector of the facial landmark in the provided facial image and the angle of the landmark vector of the corresponding facial landmark in the captured facial image. This provides a robust feature vector that is less affected by pose and expression in the depicted faces, which may negatively affect relative positions of facial landmarks with regard to each other. In particular, minor pose variations and expressions can be fully compensated by the angular approach, thereby increasing detection accuracy of artificial facial images.

In another embodiment, the feature vector further includes at least some distance values representing distances between at least some facial landmarks of the first plurality of facial landmarks and at least some facial landmarks of the second plurality of facial landmarks. To achieve a scaling-robust system, in a preprocessing step the facial landmarks may be normalized, for example, to a range between 0 and 1. It is to be understood that the facial landmarks may be normalized to extract angular values only or distance values only, or a combination of angular values and distance values. In a next step, the Euclidean distance of relative positions of each landmark $l_i$ between the provided facial image and each landmark $l_i$ of the captured facial image may be calculated and inserted as a distance value into the at least one feature vector. For example, for n facial landmarks $\Sigma_{i=1}^{n-1} i$ distance values may be calculated. Additionally or as an alternative, landmark $l_i$ of the provided facial image may be compared with the corresponding landmark $l_i$ of the captured facial image, which may result in n distance values.

Preferably, the at least one feature vector may include a combination of at least some angular values and at least some distance values in order to describe the differences or variations between the provided facial image and the captured facial image of the subject. The at least one feature vector may be further processed and individual values may be selected from the feature vector and used to classify the provided facial image as a real facial image of the subject or as an artificial facial image using a respectively trained classifier.

In at least one embodiment, the method further comprises determining an identity of the subject, and accessing a service to request at least one further facial image of the subject, wherein the at least one feature vector is extracted based on at least some facial landmarks corresponding to the requested at least one further facial image. The identity of the subject may be determined based on indications on an electronic document provided by the subject, such as an electronic document including the provided facial image. Additionally or as an alternative, the identity of the subject may be determined based on an initial facial scan, based on the captured facial image, or based on the provided facial image. The determined identity may be used to request one or more further facial images of the subject from a trusted service. The one or more further facial images may be bona fide facial images, which may have been previously captured in a trusted environment. The one or more further facial images may be used as an additional data source during feature extraction. This leads to a more robust classification of the provided facial image.

In at least one embodiment, the provided facial image is a two-dimensional facial image, wherein the first plurality of facial landmarks includes two-dimensional facial landmarks. The provided facial image may be defined as an array of picture elements (pixels), each pixel including one or more color values, such as grey values, three or more color components, and/or transparency values, such as alpha values for each pixel. The first plurality of facial landmarks may indicate a position of the facial landmark in the provided facial image, for example by specifying the position of the facial landmark (x, y) or by identifying the respective pixel (i, j) containing the facial landmark. Furthermore, the position may be defined as a relative position, for example with regard to a center or any other facial landmark of the face depicted in the provided facial image, wherein the position may be further transformed, such as rotated, translated or scaled and/or normalized, in any combination.

In another embodiment, the captured facial image is a three-dimensional facial model and the second plurality of facial landmarks includes two-dimensional facial landmarks and/or three-dimensional facial landmarks. For example, the captured facial image may include a geometrical model of at least a part of a head of the captured subject. The geometrical model may be represented by a three-dimensional mesh of geometric elements representing the surface of the head, such as the face. Preferably, the provided facial image may be a two-dimensional facial image, from which two-dimensional facial landmarks can be derived that are suitable to be compared with facial landmarks stemming from a three-dimensional model, which was captured in a trusted mode under supervision. The geometrical model may include a number of vertices, connected by edges, thereby defining a set or mesh of triangles or other geometric primitives. Each element of the geometric model, such as a vertex, an edge, a triangle, or a primitive, may be associated with color values and/or textures specifying color values for the element. Hence, for each element or a position on the element, a color value may be determined. Additionally or as an alternative, the three-dimensional facial model may be defined as a two-dimensional array of pixels that may include color values and depth values, for each pixel, wherein the depth value may represent a position of the respective pixel in space. Further or alternative representations of the three-dimensional facial model may include a voxel representation or a point cloud representation, and the like, as known in the art. Based on a structure of the captured facial image or of the three-dimensional facial model, the second plurality of facial landmarks may include landmarks, which may correspond to positions on a two-dimensional array corresponding to a projection of the captured facial image, or three-dimensional facial landmarks that may define a position of the facial landmark in space, preferably relative to the three-dimensional facial model. The two-dimensional facial landmarks and three-dimensional facial landmarks may be combined in the second plurality of facial landmarks as required and the present disclosure is not restricted to a particular definition or dimensionality of the facial landmarks. Rather, any number of facial landmarks of any dimensionality in any combination, such as one or more of one-dimensional, two-dimensional, three-dimensional, four-dimensional facial landmarks, and the like, may be used in the first and/or the second plurality of facial landmarks.

Preferably, corresponding to the definition of the provided facial image and/or a respective first plurality of facial landmarks, the captured facial image may be scanned in a corresponding manner, in order to determine a corresponding second plurality of facial landmarks. For example, if the first provided facial image and the first plurality of facial landmarks represent two-dimensional positions on a two-dimensional array, the captured facial image may be converted to a two-dimensional array and respective two-dimensional facial landmarks may be determined to define the corresponding second plurality of facial landmarks. Similarly, if the provided facial image is a three-dimensional facial model and the first plurality of facial landmarks includes three-dimensional facial landmarks, the captured facial image may be a three-dimensional facial model and the second plurality of facial landmarks may include two-dimensional facial landmarks and/or three-dimensional facial landmarks corresponding to the facial landmarks in the first plurality of facial landmarks. Furthermore, even though the provided facial image may be a two-dimensional facial image, the captured facial image may be a three-dimensional facial image or a three-dimensional facial model including depth information. This may enable a more precise determination of facial landmarks in the captured facial image.

In at least one embodiment, the method further comprises training the classifier with feature vectors extracted from a training set of real facial images and artificial facial images, such as preferably morphed facial images. The training set may be adjusted to represent typical real facial images and respective artificial images that are to be classified, such as morphed facial images. Accordingly, it is to be understood that one or more embodiments of the present disclosure may work with pairs of facial images instead of single images, such as bona fide vs. morphed facial image, or bona fide vs. bona fide to train the classifier.

In another embodiment, the method further comprises using a set of features from the feature vector to classify the provided facial image, wherein the set of features is pre-determined based on weights of respective features resulting from training of the classifier. During training of the classifier, the contribution of the individual features in the feature vector may be estimated. Those features having the highest weights in the respective classifier may be included into the pre-determined set of features. Accordingly, the features extracted into the at least one feature vector may either include only those features of the pre-determined set of features or the classifier may receive the full feature vector and may select the pre-determined set of features for classification of the provided facial image. A selection of individual features increases accuracy of classification of facial images as discussed further below.

In at least one embodiment, the classifier is a non-linear classifier, including a Support Vector Machine (SVM) or a Random Forest classifier. Most preferably, the classifier is a Random Forest classifier with 500 estimators. However, it is to be understood that other trainable, non-linear classifiers may be used to classify the provided facial images.

In another embodiment, the provided facial image is a printed facial image. In yet another embodiment, the provided facial image may be a digital facial image stored in a memory. For example, the provided facial image may be stored on an electronic document or the provided facial image may be printed on the electronic document. It is to be understood that the electronic document may also include a storage comprising an electronic version of the provided facial image as well as a layer including the printed version of the provided facial image.

In yet another embodiment, the electronic document or a respective memory may store the provided facial image in electronic form and/or the first plurality of facial landmarks, wherein the electronic document may further display a printed version of the provided facial image thereon. The method may include scanning of the printed provided facial image and generating a third plurality of facial landmarks based on the scanned facial image, which may be compared to the first plurality of facial landmarks stored on the electronic document or in respective memory. This may further improve reliability of the authentication process.

The method according to one or more embodiments of the present disclosure may be a computer-executable method for execution by a computing device having a processor. The individual method steps may be defined as one or more instructions stored in a memory of the computing device. The processor may access the memory, retrieve the instructions and perform the individual method steps in a suitable order, such as sequentially or in parallel, as appropriate. The computing device may include one or more input interfaces, such as a reader or a scanner that may be configured to retrieve the first and the second plurality of facial landmarks and/or to read or to obtain the provided facial image and the captured facial image of the subject. The processor may access the input interfaces and may use a feature extractor to extract the at least one feature vector and supply the at least one feature vector to a classifier of the computing device to classify the provided facial image. Accordingly, the individual processing steps may be bound to dedicated hardware and/or software components of the electronic device that may embody the processing steps in hardware, software or as a combination of both. Accordingly, the method according to one or more embodiments of the present disclosure results in and may be embodied on a dedicated electronic device including a plurality of hardware components that process provided or captured images of real subjects and provide as output a classification of the provided facial images using hardware means of the electronic device.

According to another aspect of the present disclosure, one or more computer-readable media are provided, which may be tangible media, wherein the media may store instructions thereon that, when executed by a processor of a computing device, configure the computing device to perform a method according to one or more embodiments of the present disclosure. In at least one embodiment, the computing device may be configured to retrieve a first plurality of facial landmarks of a provided facial image associated with a subject, determine a corresponding second plurality of facial landmarks of a captured facial image of the subject, extract at least one feature vector based on differences between at least some of the first plurality of facial landmarks and corresponding facial landmarks of the second plurality of facial landmarks, wherein at least some values of the at least one feature vector represent angular values of the facial landmarks, and supply the at least one feature vector to a classifier to classify the provided facial image as a real facial image of the subject or as an artificial facial image.

According to yet another aspect of the present disclosure, a device for classifying facial images is provided, the device comprising a processor configured to execute instructions stored in a memory of the device, a classifier trained to classify facial images as real facial images or as artificial facial images, a reader to read a provided facial image associated with a subject, and a scanner to obtain a captured facial image of the subject, wherein the processor is further configured to retrieve a first plurality of facial landmarks of the provided facial image associated with the subject, determine a corresponding second plurality of facial landmarks of the captured facial image of the subject, extract at least one feature vector based on differences between at least some of the first plurality of facial landmarks and corresponding facial landmarks of the second plurality of facial landmarks, wherein at least some values of the at least one feature vector represent angular values of facial landmarks, and to supply the at least one feature vector to the classifier to classify the provided facial image as a real facial image of the subject or as an artificial facial image.

According to yet another aspect, a system including at least one device according to one or more embodiments of the present disclosure is provided. In particular, the system may include at least one device for classifying facial images, the device comprising a processor configured to execute instructions stored in a memory of the device, a classifier trained to classify facial images as real facial images or as artificial facial images, a reader to read a provided facial image associated with a subject, and a scanner to obtain a captured facial image of the subject, wherein the processor is further configured to retrieve a first plurality of facial landmarks of the provided facial image associated with the subject, determine a corresponding second plurality of facial landmarks of the captured facial image of the subject, extract at least one feature vector based on differences between at least some of the first plurality of facial landmarks and corresponding facial landmarks of the second plurality of facial landmarks, wherein at least some values of the at least one feature vector represent angular values of facial landmarks, and to supply the at least one feature vector to the classifier to classify the provided facial image as a real facial image of the subject or as an artificial facial image.

In at least one embodiment, the system further comprises one or more reader devices configured to read provided facial images and one or more scanner devices to scan faces of subjects to generate captured images of the subjects. The system may be or form part of an automated border control system for authenticating passengers based on electronic passports. The system may read a facial image provided on an electronic passport of a subject, such as a passenger, may scan the subject to generate the captured bona fide facial image and may process both images to determine whether the facial image provided on the electronic passport is an artificial facial image, such as a morphed facial image, or a real facial image of the subject or passenger. According to another use case, the system may be installed at an issuing authority for electronic documents and may include a scanner to scan a provided printed photograph as the provided facial image associated with an applicant for an electronic document, a further scanner to scan the applicant to generate the captured facial image of the applicant and may further process both images to determine whether the provided facial image is a real facial image of the applicant or an artificial facial image, such as a morphed facial image.

According to another embodiment, the system further comprises a secured database including verified facial images of subjects. The secured database may be accessed to retrieve further facial images of the respective subject that are to be classified. The further facial images may be used to further aid in evaluating the provided facial image and determining whether the provided facial image is a real facial image or an artificial facial image.

It is to be understood that the method according to one or more embodiments of the present disclosure may include method steps corresponding to a functional configuration of components of any device or system according to one or more embodiments of the present disclosure, in any combination. Likewise, the device and system according to one or more embodiments of the present disclosure may include hardware and/or software components that may be configured to perform any steps of one or more embodiments of the method of the present disclosure, in any combination.

BRIEF DESCRIPTION OF THE SEVERAL VIEWS OF THE DRAWINGS

The specific features, aspects and advantages of the present disclosure will be better understood with regard to the following description and accompanying drawings, where.

DETAILED DESCRIPTION

In the following description, reference is made to drawings, which show by way of illustration various embodiments. Also, various embodiments are described below by referring to several examples. It is to be understood that the embodiments may include changes in design and structure without departing from the scope of the claimed subject matter.

Figure 1:
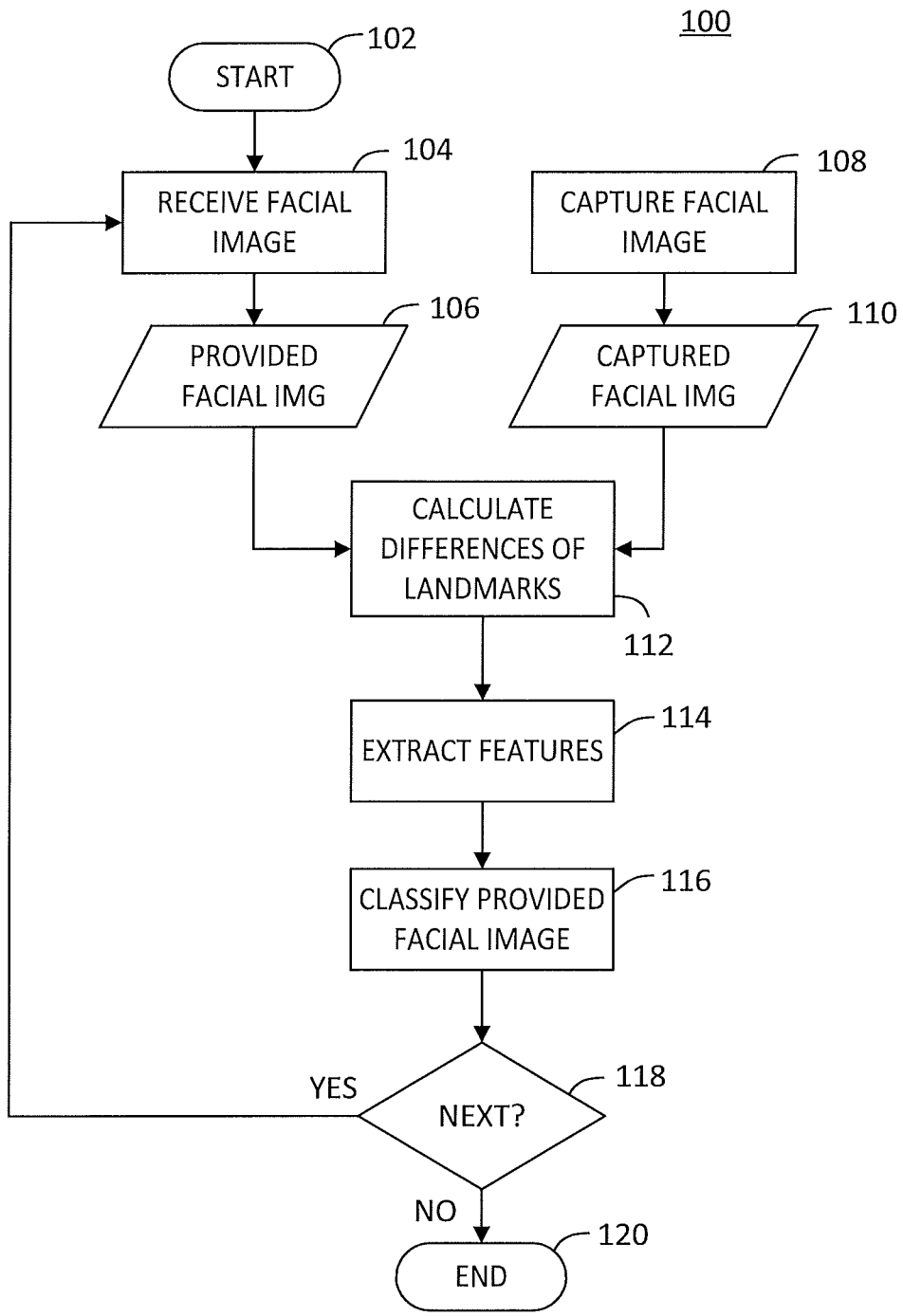
FIG. 1 illustrates a flowchart of a method according to an embodiment of the present disclosure.

FIG. 1 shows a flowchart of a method for classifying facial images according to an embodiment of the present disclosure.

The method 100 may start in item 102 and may proceed with retrieving a facial image associated with a subject, wherein the facial image is to be classified as a real facial image of the subject or as an artificial facial image. The retrieved facial image may be referred to as a provided facial image 106 throughout this disclosure.

The method 100 may proceed with item 108, wherein the subject associated with the provided facial image 106 may be scanned to capture another facial image, which may be referred to as a captured facial image 110 throughout this disclosure. Since the captured facial image 110 may be generated in a trusted environment, it may also be referred to as a bona fide (facial) image.

The method 100 may proceed with retrieving a first plurality of facial landmarks corresponding to the provided facial image 106. The first plurality of facial landmarks may be stored in a memory associated with the provided facial image 106, such as a memory of an electronic document. In this case, the facial landmarks may be directly retrieved. In case the provided facial image 106 represents a printed photograph, the provided facial image 106 may be scanned and the first plurality of facial landmarks may be determined.

The method 100 may further determine a second plurality of corresponding facial landmarks of the captured facial image 110. The first and the second plurality of facial landmarks may be determined using the same approach, for example, by utilizing a same facial landmark predictor, which may be configured the same way for both images 106, 110 to determine a number of corresponding facial landmarks. However, it is to be understood that another configuration of the facial landmark predictor and other approaches for determining facial landmarks may be used if corresponding facial landmarks can be determined for the first and second plurality of facial landmarks.

The method 100 may proceed with item 112, wherein the differences between facial landmarks of the first plurality of facial landmarks and facial landmarks of the second plurality of facial landmarks may be calculated and used to extract features in item 114. For example, a difference between corresponding facial landmarks of the first plurality of facial landmarks and of the second plurality of facial landmarks may be calculated. Additionally or as an alternative, differences between different facial landmarks of the first plurality of facial landmarks and of the second plurality of facial landmarks may be calculated. The different facial landmarks in respective sets may be specified by semantic dependencies.

In one example, each facial landmark of the first or second set (or plurality) of facial landmarks may be associated with a neighboring facial landmark in the same set (or plurality) of facial landmarks according to such semantic dependencies between the facial landmarks. A landmark vector may be defined by the facial landmark and an associated facial landmark and an orientation of the landmark vector with regard to a pre-defined axis within the facial image may be determined. The orientation of the landmark vector corresponding to a landmark in the first set of facial landmarks may be compared with the corresponding orientation of the landmark vector of a corresponding facial landmark in the second set of facial landmarks to define a difference of the corresponding facial landmarks. Accordingly, the extracted feature may represent the difference of orientations of landmark vectors for each facial landmark in the first set of facial landmarks and the corresponding facial landmarks of the second set of facial landmarks, thereby defining an angular value or an angular feature.

Additionally, or as an alternative, at least some of the features in the feature vector may be based on distances between corresponding facial landmarks in the first set (or plurality) of facial landmarks and the second set (or plurality) of facial landmarks, thereby defining distance values or distance features. The distance features may be based on distances of corresponding facial landmarks in the two sets and/or distances of different facial landmarks (which may be determined based on semantic dependencies) in the two sets, which may result in up to $\Sigma_{i=1}^{n-1} i$ features for n landmarks.

At least some of the features extracted in item 114 may be supplied to a classifier that may be trained and configured to classify the provided facial image 106 as either a real facial image of the subject or as an artificial facial image, in item 116. According to results of the classification 116, the provided facial image 106 may be rejected or accepted as a facial image of the subject.

The method 100 may proceed with item 118, where it may be determined whether a further facial image is to be classified. In this case, the method 100 may proceed with item 104 by retrieving a next facial image. If no further facial image is to be classified, the method 100 may end in item 120.

Figure 2:
FIG. 2 shows an example of real images and a morphed facial image that can be classified using an embodiment of the present disclosure.

FIG. 2 shows example of an artificial facial image and two real facial images that may be classified using an embodiment of the present disclosure. FIG. 2 shows two real facial images 202a and 202b of two different subjects. The images 202a and 202b are morphed into a morphed facial image 204, which includes slightly distorted features of both subjects depicted in facial images 202a and 202b. Accordingly, in an automated face detection process, the morphed facial image 204 may be used to most likely identify, verify or authenticate both subjects depicted in facial images 202a and 202b. This type of attack may also be referred to as a morphed face image attack and represents a severe threat to automated face recognition systems.

Morphing of images is well known in computer graphics and image processing and enables a substantially seamless transition between two images, such as images 202a and 202b, wherein a resulting morphed image may depend on a weight a describing a contribution of one of the images 202a, 202b to the final morphed facial image 204. Morphing may include identifying corresponding landmarks in both images 202a and 202b and blending both images 202a and 202b into each other based on a transformation of the individual facial landmarks, such as translation, rotation and scaling of the individual facial landmarks. The facial landmarks may be characteristic key points, which in case of facial images may correspond to facial landmarks, such as position and contour of the nose, location and contour of the eyes, a contour or shape of the mouth, and the like, in any combination. Hence, for corresponding facial landmarks $l_i$ and $l_j$ in the images 202a and 202b, respectively, the corresponding facial landmark $l_m$ in the morphed facial image 204 may be defined as a linear map $l_m=(1-\alpha)l_i+\alpha l_j$. However, it is to be understood that any other suitable model for morphing of images, including non-linear mapping of features, may be used. Hence, it may be assumed that intra-subject variances of facial landmarks extracted from real images, such as images 202a and 202b of the same subject are smaller than variances of facial landmarks of a morphed facial image 204 and real images 202a, 202b of contributing subjects.

Figure 3:
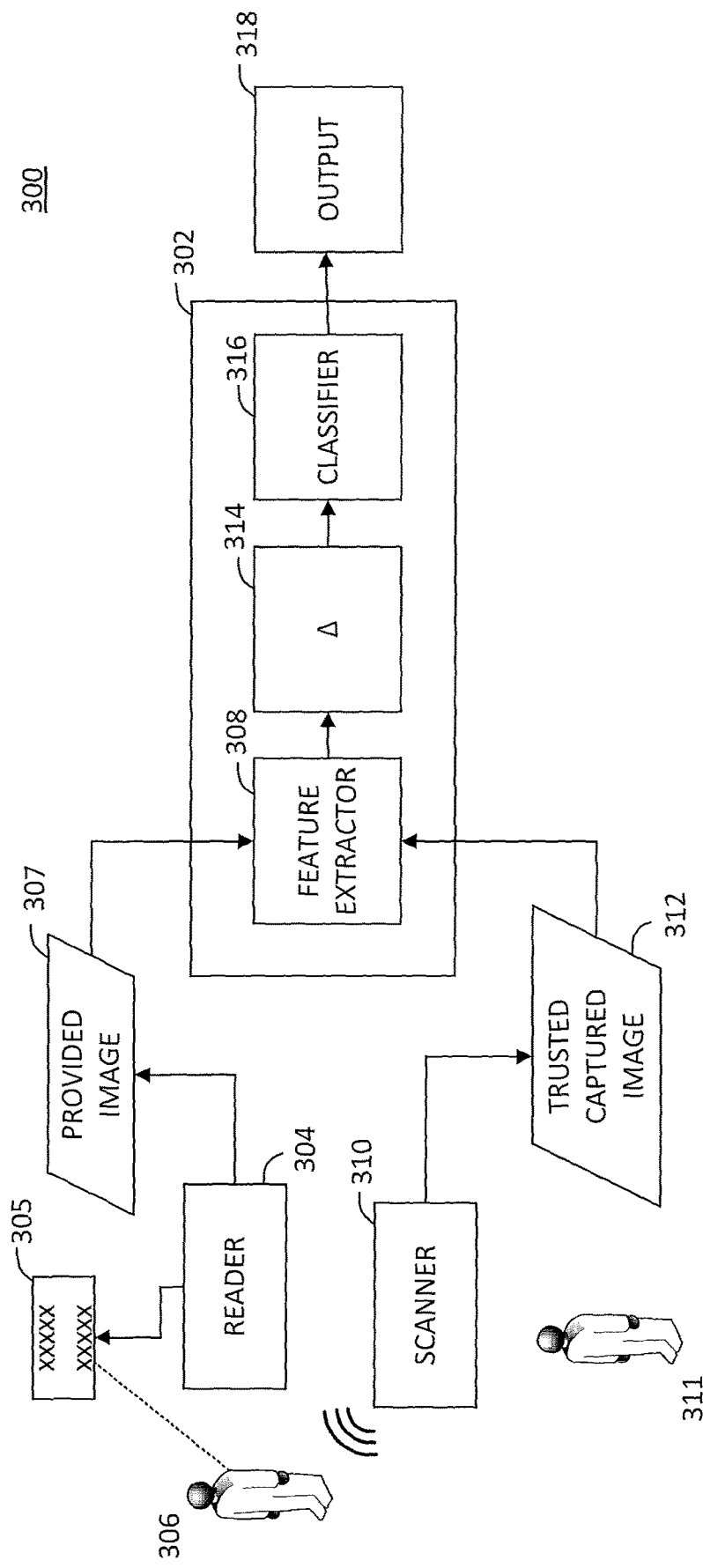
FIG. 3 is a schematic illustration of a system for classifying facial images according to an embodiment of the present disclosure.

FIG. 3 shows a schematic illustration of a system for classifying facial images according to an embodiment of the present disclosure.

The system 300 may include one or more computing devices, wherein FIG. 3 shows, as an example, a single device 302. However, it is to be understood that any of the one or more computing devices may be interconnected and may include one or more components of device 302 in any combination. The device 302 may include a processor and memory, wherein the memory may store instructions that may be accessed and executed by the processor, to configure the device 302 to classify facial images. The device may further include (or may be coupled to) a reader 304, which may be configured to read an electronic document 305, such as an electronic passport provided by a subject 306, to provide a provided facial image 307 claimed to be associated with the subject 306. The reader 304 may supply an electronic version of the provided facial image 307 to an extractor 308 of the device 302.

The extractor 308 may be configured to extract facial landmarks from facial images. The extractor 308 may preprocess the image, for example, by one or more of rotating, scaling and translating the image in order to generate a normalized facial image. The extractor 308 may implement a landmark detector, which may determine a predefined set of facial landmarks for any (normalized) facial image. For example, the landmark detector may determine absolute positions of 68 facial landmarks ($l_0, \ldots, l_{67}$), as further detailed with regard to FIG. 4. However, it is to be understood that the present disclosure is not limited to a particular number or set of facial landmarks. Rather, any number of facial landmarks and any specified set of the facial landmarks may be extracted by extractor 308. The extractor 308 may be further configured to normalize the facial landmarks to a range, for example, between 0 and 1 or −1 and 1, or any other suitable range. The range may be preconfigured or may represent an adjustable and adaptable range. For example, absolute positions of facial landmarks may be normalized and further processed to generate relative positions of the facial landmarks relative to a center of the facial image.

After determining the facial landmarks of the provided facial image 307, or concurrently to this processing, the device 302 may trigger a scanner 310 to scan the face of the subject 306 providing the electronic document 305. Additionally or as an alternative, the scanner 310 may also be triggered and/or operated by a supervisor 311. The scan may result in a (trusted) captured image 312, which may be provided to the extractor 308 of the device 302, wherein the extractor 308 may perform the same processing and landmark extraction as with the provided facial image 307. The resulting sets of facial landmarks of both images 307, 312 may be submitted to a differentiator 314, which may process both sets of facial landmarks.

The differentiator 314 may associate the facial landmarks within each set of facial landmarks with regard to other facial landmarks in the same set, which may also be referred to as mated facial landmarks. For example, each facial landmark may be associated or mated with a neighboring facial landmark according to a pre-defined mapping. The association may be based on semantic dependencies of the facial landmarks. The differentiator 314 may then define for each facial landmark a landmark vector between the facial landmark and its associated facial landmark. The differentiator 314 may retrieve an axis of the respective facial image and may determine an orientation of the landmark vector with regard to the axis, such as an angle of the landmark vector with respect to the axis. The differentiator 314 may then compare corresponding landmark vectors derived from the two sets of facial landmarks and may extract a feature based on the differences of the orientations of the corresponding landmark vectors. For n facial landmarks in each set, this may result in n angular features.

The differentiator 314 may further take into consideration distances between the facial landmarks in the two sets of facial landmarks. This may include a distance between two corresponding facial landmarks in the two sets, and distances between any pair of facial landmarks in the two sets. Hence, for n facial landmarks in each set, this may result in n distance features or up to $\Sigma_{i=1}^{n-1}$ i distance features for mixed pairs.

After extraction and comparison of the two sets of facial landmarks, the differentiator 314 may generate at least one feature vector which may be supplied to a classifier 316 of the device 302. The classifier 316 may be a linear classifier or a non-linear classifier, which may include one or more Support Vector Machines with a radial basis function kernel or a Random Forest classifier with 500 estimators, or similar configurations, such as less or more estimators. The classifier 316 may be trained using a training set of facial images, which may include real facial images and artificial facial images. Preferably, the classifier 316 may be trained using pairs of images instead of single images in each training row. The classifier 316 may be pre-trained, such that the device 302 may be deployed with a pre-configured classifier 316. However, device 302 may further provide means for adjusting the classifier 316, such as training the classifier 316 for a particular configuration of facial images or for a particular type of artificial images. The classification performed by classifier 316 may result in a determination whether the provided facial image 307 on electronic document 305 is a real image of the subject 306 or an artificial facial image, such as a morphed facial image of a plurality of subjects. The result may be provided via output 318, which may include a visual, acoustic, or a haptic output or an output of any other modality, in any combination. The output 318 may include one or more hardware components to render the result in the respective modality, such as one or more displays, one or more loudspeakers, one or more force feedback devices, and the like. Information may be provided, via the output 318, to one or more other devices that may automatically guide the subject 306 based on the results. The information may also be provided to a (human) operator, such as supervisor 311, in order to semi-automatically decide whether to accept or reject the electronic document 305.

Figure 4:
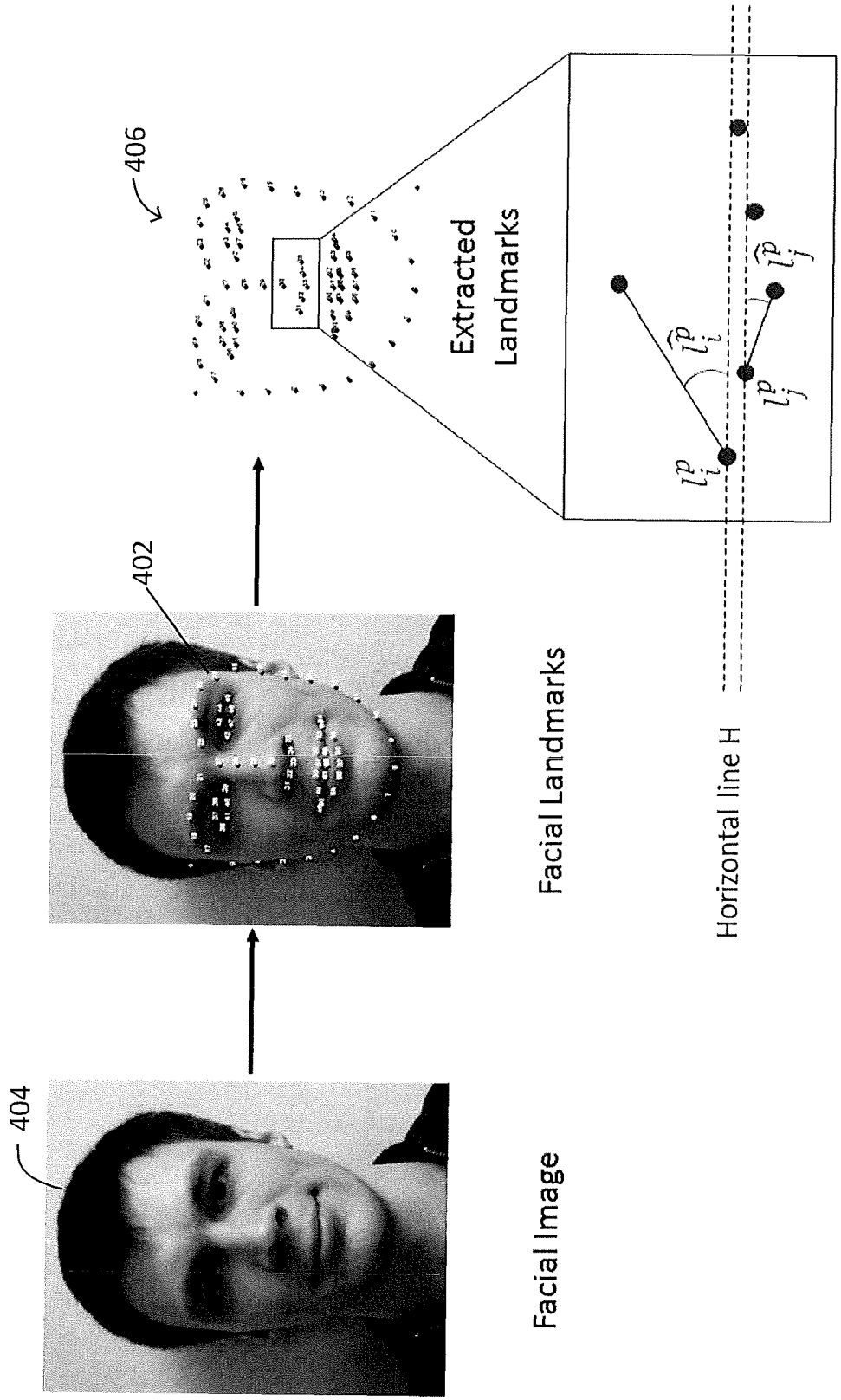
FIG. 4 illustrates landmark detection applicable in an embodiment of the present disclosure.

FIG. 4 shows details of facial landmark extraction and angular features applicable in an embodiment of the present disclosure. The processing and features shown in FIG. 4 may be applicable in method 100 of FIG. 1 or system 300 in FIG. 3.

A pre-configured landmark detector may be used to extract a set of facial landmarks 402 from a facial image 404. Both, the facial image 404 and the resulting set of facial landmarks 402 may be transformed and scaled in order to generate a normalized set of facial landmarks 406. Each facial landmark of the normalized set of facial landmarks 406 may be annotated or identified, for example, by using an index, which may further define semantic dependencies between the facial landmarks. For example, the semantic dependency may group individual facial landmarks as belonging to certain objects identified in the face, such as the eyes, the nose, the mouth, and the like, in any combination. For each facial landmark, an associated facial landmark according to semantic dependencies may be defined. The dependencies may be based on the grouping of the objects in the face or a neighboring relationship. For example, landmarks related to the eyes or to the mouth, may be associated to form a contour of the respective object in the face.

In order to determine angular features related to the set of facial landmarks 406, for a facial landmark $l_i^p$ and the corresponding landmark vector defined by $l_i^p$ and the mated facial landmark, an angle $\widehat{l_i^p}$ of the landmark vector with a predetermined axis, such as a horizontal line H, may be determined. This may be repeated for any other facial landmark in the set, such as facial landmark $l_j^p$ resulting in angle $\widehat{l_j^p}$.

The same processing may be performed for another facial image, such as a captured facial image, wherein for facial landmarks $l_i^b$ and $l_j^b$, the respective angles $\widehat{l_i^b}$ and $\widehat{l_j^b}$ may be calculated. The angles may be compared, for example by the differentiator 314 of FIG. 3, in order to generate a feature vector including angular values or angular features. For example, angular values may be calculated as:

$$d(\widehat{l_i^p}, \widehat{l_i^b}) = \min(|\widehat{l_i^p} - \widehat{l_i^b}|, 360 - |\widehat{l_i^p} - \widehat{l_i^b}|), i = 0 \ldots 67.$$

Accordingly, an angular value may be understood as an angle of the corresponding landmark vector. In order to avoid unrealistically high differences, the results may be limited to a positive difference between 0° and 180°.

Figure 5:
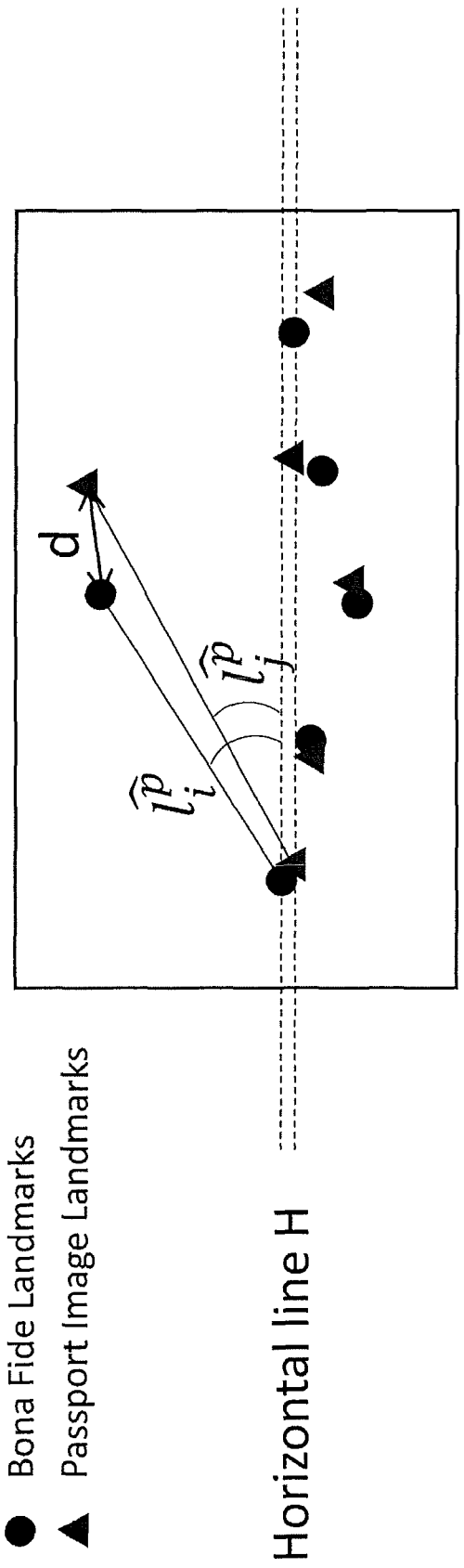
FIG. 5 shows a definition of features applicable in an example of the present disclosure.

Further to angular features, the resulting feature vector may include distance features, as illustrated in FIG. 5. It is to be understood that the features extracted in FIG. 5 may be processed based on a set of facial landmarks, such as the set of facial landmarks 406 shown in FIG. 4. The initial set of facial landmarks ($l_0, \ldots, l_{67}$) may be normalized to a range between 0 and 1. The Euclidian distance of $d_j$ of relative positions of two landmarks $l_i^p$ and $l_j^b$ from two sets of facial landmarks, for example, derived from a provided facial image and a captured facial image according to the method 100 and the system 300 of FIGS. 1 and 3, respectively, may be calculated. This may result in a feature vector of length $\sum_{i=1}^{n-1} i$, wherein each value of the feature vector may be referred to as a distance value or distance feature.

The angular features and preferably at least some distance features may be used as a feature vector that may be supplied to a classifier in order to classify the provided facial image as either a real facial image of the subject or as an artificial facial image.

Based on a training of the classifier, a subset of the features, for example, including at least some or all of the angular features and/or at least some or all of the distance features, may be formed and the subset may be submitted to the classifier as the feature vector for classifying the facial image. The selection of features for the subset may be based on an identification of features with a highest weight, contribution, influence or selectivity with regard to the classification during the training of the classifier.

Embodiments of the present disclosure enable a detection of morphed facial images utilizing a captured real (bona fide) facial image of a subject, which claims to be associated with the facial image to be evaluated. Embodiments of the present disclosure generalize over different face morphing techniques and enable a classification of a broad range of artificial facial images. Furthermore, the facial landmark-based approach is robust to lighting variations and other environmental conditions. The present disclosure provides for a highly robust and reliable classification of facial images as real facial images or as artificial facial images in a variety of use cases and scenarios.

Embodiments of the present disclosure may be applicable in one or more use cases.

In at least one use case, during an application process for electronic documents, such as electronic travel documents, an applicant may provide a printed photograph or a digital form of a photograph as a provided facial image, wherein the applicant may claim that the provided facial image corresponds to the depicted subject (the applicant). During the application process, the face of the applicant may be scanned, thereby generating a trusted captured facial image of the applicant. Facial landmarks of both facial images may be determined and differences between at least some of the facial landmarks of the two facial images may be calculated, resulting in a feature vector that may include at least angular values and/or distance values related to the facial landmarks. The feature vector may be submitted to a classifier in order to classify the photograph as a real facial image of the applicant or as an artificially generated or morphed image.

In another use case of automated border control based on biometric passports, a passenger may present an electronic passport including a facial image and/or a representation of facial landmarks corresponding to the provided facial image. A scanner may (automatically) scan the face of the passenger in order to generate a trusted captured facial image and corresponding facial landmarks may be determined. Differences of the facial landmarks may be calculated, for example based on mated facial landmarks, and a feature vector may be extracted, which may include angular values and/or distance values corresponding to the facial landmarks in both images. The resulting feature vector may be supplied to a classifier to classify the facial image of the electronic passport as a real facial image of the passenger or as an artificial facial image, such as a morphed facial image.

Even though particular use cases have been described with regard to embodiments of the present disclosure, it is to be understood that one or more embodiments of the present disclosure may be applicable in other and different use cases, without limiting the scope of the present disclosure.

While some embodiments have been described in detail, it is to be understood that aspects of the disclosure can take many forms. In particular, the claimed subject matter may be practiced or implemented differently from the examples described and the described features and characteristics may be practiced or implemented in any combination. The embodiments shown herein are intended to illustrate rather than to limit the disclosure as defined by the claims.

Thus, the various embodiments described above can be combined to provide further embodiments. Aspects of the embodiments can be modified to provide yet further embodiments. These and other changes can be made to the embodiments in light of the above-detailed description. In general, in the following claims, the terms used should not be construed to limit the claims to specific embodiments disclosed in the specification and the claims, but should be construed to include all possible embodiments along with the full scope of equivalents to which such claims are entitled. Accordingly, the claims are not limited by the disclosure.

The invention claimed is:

1. A device for classifying facial images, comprising:
a processor configured to execute instructions stored in a memory of the device;
a classifier trained to classify facial images as real facial images or as artificial facial images;
a reader to read a provided facial image associated with a subject; and
a scanner to obtain a captured facial image of the subject, wherein the processor is further configured to:
retrieve a first plurality of facial landmarks of the provided facial image associated with the subject;
retrieve a corresponding second plurality of facial landmarks of the captured facial image of the subject;
extract at least one feature vector based on differences between at least some of the first plurality of facial landmarks and corresponding facial landmarks of the second plurality of facial landmarks, wherein at least some values of the at least one feature vector represent angular values of facial landmarks; and
supply the at least one feature vector to the classifier to classify the provided facial image as a real facial image of the subject or as an artificial facial image,
wherein each facial landmark in the first and second plurality of facial landmarks has an associated facial landmark in the same plurality of facial landmarks, and
wherein the processor is further configured to determine, for each facial landmark, a landmark vector between the facial landmark and the associated facial landmark.

2. The device of claim 1, wherein the artificial facial images include morphed facial images generated by morphing two or more real facial images of two or more subjects.

3. The device of claim 1, wherein the scanner is configured to scan a face of the subject to generate the captured facial image.

4. The device of claim 1, wherein the processor is further configured to determine, for each facial image, at least a first axis of a face depicted in the facial image, and determine, for each facial landmark in the corresponding plurality of facial landmarks, an angle of the landmark vector of the facial landmark with respect to at least the first axis.

5. The device of claim 4, wherein the angular value of the facial landmark is calculated as a difference between the angle of the landmark vector of the facial landmark in the provided facial image and the angle of the landmark vector of the corresponding facial landmark in the captured facial image.

6. The device of claim 1, wherein the associated facial landmark is a neighbor of the facial landmark according to semantic dependencies between the facial landmarks.

7. The device of claim 1, wherein the feature vector further includes at least some distance values representing distances between at least some facial landmarks of the first plurality of facial landmarks and at least some facial landmarks of the second plurality of facial landmarks.

8. The device of claim 1, wherein the processor is further configured to determine an identity of the subject, and access a service to request at least one further facial image of the subject, wherein the at least one feature vector is extracted based on at least some facial landmarks corresponding to the requested at least one further facial image.

9. The device of claim 1, wherein the provided facial image is a two-dimensional facial image, the first plurality of facial landmarks including two-dimensional facial landmarks.

10. The device of claim 1, wherein the captured facial image is a three-dimensional facial model, the second plurality of facial landmarks including two-dimensional facial landmarks and/or three-dimensional facial landmarks.

11. The device of claim 1, wherein the processor is further configured to train the classifier with feature vectors extracted from a training set of real facial images and artificial facial images.

12. The device of claim 1, wherein the processor is further configured to use a set of features from the at least one feature vector to classify the provided facial image, wherein the set of features is pre-determined based on weights of respective features resulting from training of the classifier.

13. The device of claim 1, wherein the classifier is a non-linear classifier, including a Support Vector Machine or a Random Forest classifier.

14. The device of claim 1, wherein the provided facial image is a printed photograph.

15. The device of claim 1, wherein the provided facial image is stored and/or printed on an electronic document, wherein the electronic document includes one or more of an identification card, an electronic travel document or a payment instrument.

16. A system including at least one device for classifying facial images, the device comprising:
a processor configured to execute instructions stored in a memory of the device;
a classifier trained to classify facial images as real facial images or as artificial facial images;
a reader to read a provided facial image associated with a subject; and
a scanner to obtain a captured facial image of the subject, wherein the processor is further configured to:
retrieve a first plurality of facial landmarks of the provided facial image associated with the subject;
retrieve a corresponding second plurality of facial landmarks of the captured facial image of the subject;
extract at least one feature vector based on differences between at least some of the first plurality of facial landmarks and corresponding facial landmarks of the second plurality of facial landmarks, wherein at least some values of the at least one feature vector represent angular values of facial landmarks; and
supply the at least one feature vector to the classifier to classify the provided facial image as a real facial image of the subject or as an artificial facial image,
wherein each facial landmark in the first and second plurality of facial landmarks has an associated facial landmark in the same plurality of facial landmarks, and
wherein the processor is further configured to determine, for each facial landmark, a landmark vector between the facial landmark and the associated facial landmark.

17. The system of claim 16, further comprising one or more readers configured to read provided facial images, and one or more scanners to scan faces of subjects to generate captured facial images of the subjects.

18. A method for classifying facial images, comprising:
retrieving a first plurality of facial landmarks of a provided facial image associated with a subject;
determining a corresponding second plurality of facial landmarks of a captured facial image of the subject;
extracting at least one feature vector based on differences between at least some of the first plurality of facial landmarks and corresponding facial landmarks of the second plurality of facial landmarks, wherein at least some values of the at least one feature vector represent angular values of facial landmarks; and
supplying the at least one feature vector to a classifier to classify the provided facial image as a real facial image of the subject or as an artificial facial image,
wherein each facial landmark in the first plurality of facial landmarks and the second plurality of facial landmarks has an associated facial landmark in the same plurality of facial landmarks, the method further comprising determining, for each facial landmark, a landmark vector between the facial landmark and the associated facial landmark.

* * * * *